(12) United States Patent
Xu et al.

(10) Patent No.: US 7,582,712 B1
(45) Date of Patent: Sep. 1, 2009

(54) ALPHA-OLEFINS POLYMERIZATION CATALYST

(75) Inventors: Guangxue Xu, Port Lavaca, TX (US); Honglan Lu, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 0 days.

(21) Appl. No.: 12/151,898

(22) Filed: May 9, 2008

(51) Int. Cl.
*C08F 4/42* (2006.01)

(52) U.S. Cl. ............... 526/124.3; 526/124.2; 526/126; 526/142; 526/348; 526/352; 502/103; 502/133; 502/116; 502/126

(58) Field of Classification Search ............. 526/124.2, 526/124.3, 126, 142, 348, 352; 502/103, 502/133, 116, 126
See application file for complete search history.

(56) References Cited

U.S. PATENT DOCUMENTS

| | | | |
|---|---|---|---|
| 3,113,115 A | 12/1963 | Ziegler et al. | |
| 4,105,585 A | 8/1978 | Matheson | |
| 5,013,702 A * | 5/1991 | Arzoumanidis et al. | 502/120 |
| 5,047,468 A | 9/1991 | Lee et al. | |
| 5,091,363 A | 2/1992 | Heimburger et al. | |
| 5,192,731 A | 3/1993 | Kioka et al. | |
| 5,260,245 A | 11/1993 | Mink et al. | |
| 5,336,652 A | 8/1994 | Mink et al. | |
| 5,561,091 A | 10/1996 | Mink et al. | |
| 5,633,419 A | 5/1997 | Spencer et al. | |
| 5,990,251 A * | 11/1999 | Gelus | 526/125.7 |

FOREIGN PATENT DOCUMENTS

| | | |
|---|---|---|
| EP | 0336545 B1 | 10/1989 |
| EP | 0529977 A1 | 3/1993 |
| EP | 0703246 AL | 3/1996 |

* cited by examiner

*Primary Examiner*—Ling-Siu Choi
(74) *Attorney, Agent, or Firm*—Howrey LLP

(57) ABSTRACT

Methods and apparatus to form a catalyst precursor, comprising combining in a reactor magnesium, an alkoxysilane compound, a halogenized silicon compound, a halogenized transition metal compound, a substituted aromatic furan compound having a structural formula,

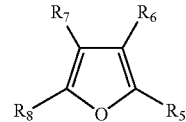

and an alkyl halide or aromatic halide compound to obtain a solid catalyst precursor, wherein the alkoxysilane compound and halogenized silicon compound are combined prior to either being exposed to the halogenized transition metal compound, and wherein the alkyl halide or aromatic halide compound is introduced to the reactor as the final step.

26 Claims, No Drawings

ALPHA-OLEFINS POLYMERIZATION CATALYST

BACKGROUND

1. Field of the Invention

The present invention relates to magnesium-based catalyst precursors, methods of preparing the catalyst precursors, and methods of using the catalyst precursors in catalyst systems to produce polyolefins, particularly polyethylene, more particularly medium density polyethylene (MDPE) and linear low density polyethylene (LLDPE).

2. Description of the Related Art

Polyethylene polymers are well known and useful in many applications. In particular, linear polyethylene polymers possess properties that distinguish them from other polyethylene polymers, such as branched ethylene homopolymers commonly referred to as LDPE (low density polyethylene). In the polyethylene industry, linear polyethylene polymers, from linear low density polyethylene (LLDPE) to medium or higher density polyethylene (MDPE or HDPE) are used in a wide variety of applications including film forming, injection molding, rotomolding, and wire and cable fabrication. As compared with counterpart LDPE resins, such linear polyethylene polymers typically exhibit enhanced high dart impact, enhanced Elmendorf tear, enhanced tensile strength and enhanced elongation in both the machine direction (MD) and the transverse direction (TD).

Ziegler-Natta type catalyst systems for the polymerization of ethylene and other olefins are well known in the art, as illustrated by U.S. Pat. No. 3,113,115. Ziegler-Natta type catalysts are particularly useful for producing polyethylene polymers in both a slurry process and a gas phase process. Advanced Ziegler-Natta catalysts based on supported titanium systems have received industrial interest for producing high performance polyethylene resins. Examples of such catalyst systems are described in U.S. Pat. Nos. 4,105,585, 5,047,468, 5,091,363, 5,192,731, 5,260,245, 5,336,652, 5,561,091, and 5,633,419 and in European Patent Applications EP-0,529,977A1, EP-0,336,545B1, and EP-0,703,246A1 all of which are herein incorporated by reference.

As an example of such Ziegler-Natta type catalyst systems, catalysts prepared in-situ by reacting magnesium metal with at least one halogenated hydrocarbon and at least one tetravalent titanium compound have been described. Reacting magnesium metal powder with butyl chloride in a non-polar solvent in the presence of $TiCl_4/Ti(OR)_4$ to form a catalyst for gas phase ethylene co-polymerization has been disclosed. Advantages of this synthesis method for preparing Ziegler-Natta catalyst are formation of homogeneous active sites and simplified preparation procedure. However, these catalysts can show broad particle size distribution, poor morphology, poor operability for producing lower density resins, and inferior comonomer incorporation. The LLDPE resins obtained using such catalysts do not have the narrow molecular weight distribution and compositional distribution that are desirable for high performance resins. Moreover, these catalyst compositions cannot produce LLDPE with a density of less than 0.917 at economically favorable production rates because of poor powder flowability. In particular, in the gas phase process this catalyst composition produces polyethylene polymer with higher electric static and higher extractable fraction, which results in resin stickiness, chunk formation, and reactor fouling at economically favorable production rates.

Other supported titanium catalyst systems for LLDPE are obtained by dissolving $MgCl_2$ with $[TiCl_3(AlCl_3)_{1/3}]$ in tetrahydrofuran (THF) to make a solution containing $MgCl_2$ and titanium halide that is subsequently immobilized on a silica support. A process wherein $MgCl_2$ is dissolved in an electron donating solvent and reacted with alkylaluminum compounds to solidify magnesium halide with aluminum alkoxy compounds has also been disclosed. The solid is then contacted with titanium halide to give a solid catalyst with effective co-polymerization ability. However, the preparation of such catalyst systems often requires complicated processing steps, and the LLDPE products obtained using these catalyst systems do not possess the narrow molecular weight distribution and the compositional distribution required for high performance resins. This inadequate molecular weight and compositional distribution presumably exists because of broadly inhomogeneous active sites in such catalyst systems.

Also, a catalyst system has been disclosed in which dialkylmagnesium and silane compounds are reacted with an —OH group on a silica support which is then contacted with a transition metal halide to form a relatively homogeneous active site. This silica supported catalyst system exhibits more homogeneous ethylene polymerization or co-polymerization capability than the previously discussed magnesium-based supported titanium halide catalyst systems as measured by resin MWD and compositional distribution. However, such catalyst systems require extra processing steps because the silica support must be treated, either chemically or thermally, to remove bound water and excess —OH groups prior to the formation of the catalyst.

Additionally, catalyst systems have been disclosed in which dialkylmagnesium compounds are impregnated into a silica support containing —OH groups to form a first reaction product. The first reaction product is then halogenated with HCl to convert the organomagnesium derived compound to $MgCl_2$ thereby forming a second reaction product. The second reaction product is then treated with a transition metal halide such as $TiCl_4$, a particular type of electron donor, and at least one Group 2 or 13 organometallic compound, such as diethylaluminum chloride. The multi-step process of this catalyst preparation is complicated and is a difficult process to use to provide controlled, stable catalyst quality.

To summarize the prior art, the preparation of Ziegler-Natta catalysts for the catalytic control of molecular weight or composition branching distribution has heretofore required complicated control of the active site formation process and careful tuning of the catalyst precipitation process to ensure formation of uniform catalyst active sites and consistent catalyst properties. Deteriorated catalyst properties are often present in the absence of control over the precipitation process, especially in multi-step processes.

Therefore, there is a need for developing catalyst systems that can be used to produce LLDPE with improved physical and chemical properties useful in a wide variety of products and applications. It would be advantageous to provide catalyst systems with the following characteristics: (1) enhanced catalyst activity and catalyst productivity; (2) narrower molecular weight distribution for polymer resins produced with the catalyst systems; (3) enhanced capability of such catalyst systems to co-polymerize ethylene and alpha-olefins; (4) reduced lower molecular weight component in polymer resin produced with the catalyst system; (5) enhanced short chain branching distribution (SCBD) or branching homogeneity in polymer resin produced with the catalyst system; (6) enhanced hydrogen response of the resin molecular weight; (7) reduced electron static during gas phase polymerization; (8) enhanced morphology and flow-ability; and (9) enhanced operation efficiency to produce LLDPE resins of lower density without resin stickiness, chunk formation, and reactor fouling in the fluidized bed gas-phase process, especially at high production rates.

SUMMARY

The present invention relates to magnesium-based catalyst precursors, methods of preparing the catalyst precursors, and methods of using the catalyst precursors in catalyst systems to produce polyolefins, particularly polyethylene, more particularly medium density polyethylene (MDPE) and linear low density polyethylene (LLDPE) The present invention relates to methods and apparatus to form a catalyst precursor, comprising combining in a reactor magnesium; a compound having the formula $R^1{}_m Si(OR^2)_n$, wherein $R^1$ and $R^2$ are independently $C_1$-$C_{20}$ hydrocarbyl, m is 0-3, n is 1-4, and m+n=4, and wherein each $R^1$ and each $R^2$ may be the same or different; a compound having the formula $R^3{}_x SiX_y$, wherein $R^3$ is $C_1$-$C_{20}$ hydrocarbyl, X is halogen, x is 0-3, y is 1-4, and x+y=4, and wherein each X and each $R^3$ may be the same or different; a compound having the formula $M(OR^4)_a X_{4-a}$, wherein M is a transition metal selected from the group consisting of Ti, Zr, Hf, and V, wherein $R^4$ is $C_1$-$C_{20}$ hydrocarbyl, X is halogen, and $0<a\leq 4$, wherein each X and each $R^4$ may be the same or different; a substituted aromatic furan compound having a structural formula,

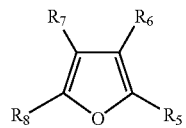

wherein $R^5$ and $R^8$ are independently $C_1$-$C_{20}$ hydrocarbons, and wherein $R^6$ and $R^7$ are independently hydrogen or $C_1$-$C_{20}$ hydrocarbons; and an alkyl halide or aromatic halide compound having the formula $R^9 X$, wherein $R^9$ is an alkyl group containing from 3 to 20 carbon atoms or an aromatic group containing from 6 to 18 carbon atoms and X is halogen; wherein the compounds having the formulas $R^1{}_m Si(OR^2)_n$ and $R^3{}_x SiX_y$, are combined prior to either being exposed to the compound having the formula $M(OR^4)_a X_{4-a}$, and wherein the alkyl halide or aromatic halide compound having the formula $R^9 X$ is introduced to the reactor after the addition of magnesium, the substituted aromatic furan, and the compounds having the formulas $R^1{}_m Si(OR^2)_n$, $R^3{}_x SiX_y$, and $M(OR^4)_a X_{4-a}$.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to magnesium-based catalyst precursors, methods of preparing the catalyst precursors, and methods of using the catalyst precursors in catalyst systems to produce polyolefins, particularly polyethylene, more particularly medium density polyethylene (MDPE) and linear low density polyethylene (LLDPE) More specifically, the present invention relates to highly active catalyst systems capable of producing ethylene/alpha-olefins copolymers, particularly, linear low-density polyethylene, having narrow molecular weight distribution, narrow branching compositional distribution, and reduced lower molecular weight component content. Also, the present invention relates to catalytic processes having improved operation efficiency that use the catalyst systems for producing linear low density polyethylene (LLDPE), medium density polyethylene (MDPE), and high density polyethylene (HDPE), having good powder flowability, high bulk density, and a small amount of fine powders.

In accordance with various embodiments, catalyst systems of the present invention may be used to produce low density (0.9140 to 0.920 g/cm³), medium density (0.930 to 0.940 g/cm³) and/or high density (greater than 0.940 g/cm³) polyethylene under varying conditions of comonomer and hydrogen. Catalyst precursors of the present invention can be combined with cocatalysts, typically and preferably an organoaluminum compound, to form solid catalyst systems for the polymerization of alpha-olefins. As explained below, catalyst systems in accordance with the various embodiments of the present invention can be used for slurry polymerization or can be subjected to pre-polymerization, which renders the catalyst system suitable for gas phase polymerization processes. This detailed description describes catalyst precursor components and preparation, catalyst system preparation, polymerization, and examples.

Formation of Catalyst Precursor-Components

One aspect of the present invention is a catalyst precursor prepared in the presence of an aromatic furan. The catalyst precursor is prepared using the following components: Magnesium, Alkoxy Silane, Haloginated Silicon, Haloginated Transition Metal Compound, Aromatic Furan Compound, and Alkyl or Aromatic Halide. Each of these components is described herein in greater detail. The capitalized Title Case has been specifically chosen to clarify that the designation chosen for each of these components should not be construed as limiting or defining the characteristics of the component.

Magnesium

The source and form of magnesium is not generally limited. Magnesium metal is desirable, and a preferable magnesium source is finely divided metallic magnesium such as magnesium powder. In accordance with various embodiments, the magnesium may be heated under nitrogen prior to use to facilitate subsequent reactions. Similarly, in various embodiments, subsequent reaction of the magnesium can be facilitated by a treatment step in which magnesium is exposed to (1) iodine, (2) alkyl-alcohol, and/or (3) alkyl or aromatic halide, desirably each in relatively small amounts. While not being limited to this mechanism, the inventors believe that the use of one or more of these species may facilitate subsequent reactions involving the magnesium by removing surface oxide on the magnesium. As such, the use of magnesium free of such oxide could obviate consideration of this treatment step.

In such embodiments, the treatment step might involve the use of one or more of the following: 1-propanol, 2-propanol, 1-butanol, 2-butanol, 1-pentanol, 2-pentanol, butylchloride, butylbromide, and 1,2-dibromoethane. When the treatment step is employed, the iodine to magnesium ratio is desirably in amounts ranging from 0.005 to 0.10, the alkylalcohol to magnesium ratio is desirably in amounts ranging from 0.01 to 0.5, and the alkyl or aromatic halide to magnesium ratio is desirably in amounts ranging from 0.01 to 0.2. Any (3) alkyl or aromatic halide, generally described as RX, employed in the treatment step is independent of (and distinct from) any amount of Alkyl or Aromatic Halide, subsequently described herein, even if the same compound is used as both the alkyl or aromatic halide of the treatment step and the subsequently described Alkyl or Aromatic Halide. While the conditions of any such treatment step are not critical, the initial reaction temperature is typically from about 20° C. to about 200° C., more desirably from about 80° C. to about 90° C., and the reaction time is typically from about 0.5 to about 20 hours, more desirably from about 0.5 to about 2 hours, and even more desirably from about 0.5 to about 1 hour.

Alkoxysilane

In accordance with various embodiments of the present invention, suitable Alkoxysilane compounds have the formula $R^1{}_m\text{Si}(OR^2)_n$. $R^1$ and $R^2$ are independently any $C_1$-$C_{20}$ hydrocarbyl (which includes both unsubstituted and substituted species, including halogen substituted species), m is 0-3, n is 1-4, and m+n=4. More than one hydrocarbyl or substituted hydrocarbyl group may be employed as the $R^1$ component, and more than one hydrocarbyl or substituted hydrocarbyl group may be employed as the $R^2$ component. Suitable Alkoxysilane compounds include tetramethoxysilane, tetraethoxysilane, tetraisopropoxysilane, tetrapropoxysilane, tetrabutoxysilane, tetraisobutoxysilane, tetraphenoxysilane, tetra(p-methylphenoxy)silane, tetrabenzyloxysilane, tetrakis(2-methoxyethoxy)silane, tetrakis(2-ethylhexoxy)silane, tetraallyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyltrimethoxysilane, octadecyltrimethoxysilane, octadecyltriethoxysilane, octyltriethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropyloxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropyloxysilane, dibutyl-dibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyl-diethoxysilane, divinyl diphenoxysilane, diallyldipropoxysilane, diphenyldiallyloxysilane, methylphenyldimethoxysilane, chlorophenyldiethyoxysilane, 1,1,1,3,3-pentamethyl-3-acetoxydisiloxane, triehoxysilane, trimethoxysilane, triethoxychlorosilane, and trimethoxy-chlorosilane. Particularly preferable compounds are tetramethoxysilane, tetraethoxysilane, tetraisopropoxysilane, tetrapropoxysilane, tetrabutoxysilane, and tetraisobutoxysilane. More than one Alkoxysilane compound may be used in combination.

Halogenized Silicon

In accordance with various embodiments of the present invention, suitable Halogenized Silicon compounds are halogen-substituted silanes having the formula $R^3{}_x\text{Si}X_y$, wherein $R^3$ is $C_1$-$C_{20}$ hydrocarbyl (which includes both unsubstituted and substituted species, including halogen substituted species), X is halogen, x is 0-3, y is 1-4, and x+y=4. More than one hydrocarbyl group $R^1$ may be employed, and more than one halogen X may be employed. Suitable halogen-substituted silane compounds include tetrabromosilane, tetrafluorosilane, tetrachlorosilane (i.e., silicon tetrachloride), allyldichlorosilane, allyltrichlorosilane, benzyltrichlorosilane, bis(dichlorosilyl)methane, 2-bromoethyltrichlorosilane, t-butyldichlorosilane, t-butyltrichlorosilane, 2-(carbomethoxy)ethyltrichlorosilane, 2-chloroethylmethyldichlorosilane, 2-chloroethyltrichlorosilane, 1-chloroethyltrichlorosilane, chloromethylmethyldichlorosilane, ((chloromethyl)phenylethyl)trichlorosilane, chloromethyltrichlorosilane, 2-cyanoethylmethyldichlorosilane, cyclohexyl-trichlorosilane, cyclopentyltrichlorosilane, cyclotetramethylenedichlorosilane, cyclotrimethylenedichlorosilane, decylmethyldichlorosilane, dibenzyloxydichlorosilane, 1,5-dichlorohexamethyltrisiloxane, (dichloromethyl)trichlorosilane, dichlorosilane, 1,3-dichloro-tetramethyldisiloxane, diethoxydichlorosilane, ethylmethyl-dichlorosilane, ethyltrichlorosilane, heptyltrichlorosilane, hexachlorodisilane, hexachlorodisiloxane, isobutyltrichlorosilane, methyltrichlorosilane, octyltrichlorosilane, pentyltrichlorosilane, propyltrichlorosilane, and trichloromethyltrichlorosilane. It is preferred to employ tetrachlorosilane, allyltrichlorosilane, ethyltrichlorosilane, methyltrichlorosilane, and dichlorodiphenylsilane. More than one Halogenized Silicon compound may be used in combination.

Halogenized Transition Metal Compound

In accordance with various embodiments of the present invention, suitable Halogenized Transition Metal Compound have the formula $M(OR^4)_aX_{4-a}$, wherein M is Ti, Zr, Hf, V, and/or Cr, $R^4$ is $C_1$-$C_{20}$ hydrocarbyl (which includes both unsubstituted and substituted species, including halogen substituted species), X is a halogen, and $0<a\leqq4$. More than one hydrocarbyl group $R^4$ may be employed, and more than one halogen X may be employed.

For transition metal M, titanium is preferred. The Halogenized Transition Metal Compound, $\text{Ti}(OR^4)_aX_{4-a}$ as an example, may be prepared in situ by reacting a titanium halide compound $\text{Ti}X_4$ with $\text{Ti}(OR^4)_4$ and/or $\text{Ti}(OR^4)_3X$ or by reacting a corresponding alcohol, $R^4OH$, with a titanium halide compound, suitably $\text{TiCl}_4$, $\text{TiBr}_4$, $\text{TiI}_4$, $\text{TiCl}_3\cdot n\text{THF}$, and $3\text{TiCl}_3\cdot\text{AlCl}_3$, and preferably $\text{TiCl}_4$, and $3\text{TiCl}_3\cdot\text{AlCl}_3$. Alternatively, $\text{Ti}(OR^4)_aX_{4-a}$ may be formed before addition to the reactor. In such instances, $\text{Ti}(OR^4)_aX_{4-a}$ may be formed by preconditioning a titanium halide compound with $\text{Ti}(OR^4)_4$ or $\text{Ti}(OR^4)_3X$ or $R^4OH$. Preconditioning may be achieved by mixing a titanium halide compound in hexane with $\text{Ti}(OR^4)_4$ or $\text{Ti}(OR^4)_3X$ in hexane and stirring at about 75° C. to about 80° C. for about 0.5 hour to about 1 hour, resulting in a $\text{Ti}(OR^4)_aX_{4-a}$ complex.

Suitable titanium compounds with structural formula $\text{Ti}(OR^4)_4$ include tetraethoxytitanium, tetra-n-propoxytitanium, tetraisopropoxytitanium, tetra-n-butoxytitanium, tetra-isobutoxytitanium, tetra-sec-butoxytitanium, tetra-tert-butoxytitanium, tetra-n-pentyloxytitanium, tetra-n-hexyloxytitanium, tetracyclohexyloxytitanium, tetra-n-heptyloxytitanium, tetra-n-octyloxy-titanium, tetra-2-ethylhexyloxytitanium, tetranonyloxytitanium, tetradecyloxytitanium, tetraoleyloxytitanium, tetraallyloxytitanium, tetrabenzyloxytitanium, tetrabenzhydryloxytitanium, tetraphenoxytitanium, tetra-o-methylphenoxytitanium, tetra-m-methylphenoxytitanium, tetra-1-naphthyloxytitanium, tetra-2-naphthyloxytitanium, and combinations thereof. Preferred $\text{Ti}(OR^4)_4$ compounds are tetra-n-propoxytitanium, tetraisopropoxytitanium, tetra-n-butoxytitanium, tetra-isobutoxytitanium, and combinations thereof. Suitable titanium compounds with structural formula $\text{Ti}(OR^4)_aX_{4-a}$ include trimethoxymonochloro-titanium, triethoxyfluorotitanium, triethoxychlorotitanium, tripropoxyfluorotitanium, tripropoxychlorotitanium, tributoxyfluorotitanium, tributoxychlorotitanium, triisobutoxychlorotitanium, dipentoxydichlorotitanium, tripentoxy-monochlorotitanium, tetracyclopentyloxytitanium, trioctyloxy-monochlorotitanium, 2-ethylhexoxytitanium trichloride, butoxytitanium trichloride, tri-2-ethylhexyloxy-monochlorotitanium, triphenoxychlorotitanium, tri-o-xylenoxychlorotitanium, and combinations thereof. Preferred Ti(OR$^4$)$_a$X$_{4-a}$ compounds are 2-ethylhexoxytitanium trichloride, butoxytitanium trichloride, dibutoxydichlorotitanium, isobutoxytrichlorotitanium, propoxytrichlorotitanium and combinations thereof. More than one Halogenized Transition Metal Compound may be used in combination.

Aromatic Furan

In accordance with various embodiments of the present invention, suitable Aromatic Furan compounds are alkyl substituted aromatic furan compounds, preferably wherein alkyl substituents are located at least at the 2- and 5-positions of the aromatic furan ring. Such, alkyl substituted aromatic furan compounds can be represented by the following structural formula (IV):

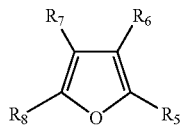

wherein the 2- and 5-positions, i.e., R$^8$ and R$^5$, respectively, are independently C$_1$-C$_{20}$ hydrocarbyl (which includes both unsubstituted and substituted species, including halogen substituted species), including alkyl, aryl, aralkyl, aryloxy, alkyl silane, alkoxy, halogen alkyl, hydroxyalkyl, carboxaldehyde, carboxylic acid, acetyl, or carboxamide. The 3- and 4-positions, i.e., R$^7$ and R$^6$, respectively, may or may not be substituted. If substituted, any substitution of R$^7$ and R$^6$ is independent of any other substitution of R$^7$ and R$^6$ and independent of any substitution at R$^8$ and R$^5$. R$^7$ and R$^6$ substitution may be alkyl substituted, such as R$^8$ and R$^5$, or otherwise substituted. Preferably R$^7$ and R$^6$ are unsubstituted (hydrogen), or if substituted, R$^7$ and R$^6$ are substituted by alkyl, alkoxy, and/or aryl and aryl derivative groups.

Representative examples of suitable Aromatic Furan compounds include, but are not limited to, 2-ethyl-3,4-dimethylfuran, 2,5-dimethylfuran, 2,5-diethylfuran, 2,5-dipropylfuran, 2,5-dibutylfuran, 2,3,4,5-tetramethylfuran, 2,3,4,5-tetraethylfuran, 2,3,4,5-tetrapropylfuran, 2,3,4,5-tetrabutylfuran, 2-ethyl-3,5-dimethylfuran, 5-ethyl-2,3-dimethylfuran, 2,5-dimethyl-3-(1-methylethyl)furan, 3,5-dimethyl-2-(1-methylethyl)furan, 2,5-dimethylfuran-3-methanol, 2,4-dimethyl-3-propylfuran, 2,3-dimethyl-5-propylfuran, 2,3-diethyl-5-methylfuran, 2,5-dimethyl-3-propylfuran, 2-(methoxymethyl)3,4,5-trimethylfuran, 2,5-diethyl-3,4-dimethylfuran, 3,4-diethyl-2,5-dimethylfuran, 2,4-diethyl-3,5-dimethylfuran, 2,5-dimethyl-3-ethylfuran, 2,3-dimethyl-5-ethylfuran, 3-ethyl-2,4-dimethylfuran, 2-ethyl-3,5-dimethylfuran, 2,3,5-trimethylfuran, 2,3,4-trimethylfuran, 3,4-bis(chloromethyl)-2,5-dimethylfuran, 3,5-bis(chloromethyl)-2-methylfuran, 3-(chloromethyl)-2,5-dimethylfuran, 2,3-dimethyl-5-(trifluoromethyl)furan, 2,4-diethyl-3,5-dimethylfuran, 2,5-Bis(bromomethyl)furan, 5-(chloromethyl)-4-methyl-2-furancarboxaldehyde, 2,4,5-trimethyl-3-furanmethanol, 3,4-dimethyl-2,5-furandicarboxaldehyde, 2,5-dimethyl-3,4-furandicarboxaldehyde, 2,4-dimethyl-3-furanmethanol, 2,5-dimethylfuran-3-methanol, 2-ethenyl-3,5-dimethylfuran, 5-ethenyl-2,3-dimethylfuran, 3,5-dimethylfurfuryl alcohol, 4,5-dimethyl-2-furanmethanol, 3,4,5-trimethyl-2-furancarboxaldehyde, 3,4,5-trimethyl-2-furancarbonitrile, 2,5-methyl-3,4-furandimethanol, 3-ethenyl-2,5-dimethylfuran, and combinations thereof. Preferred Aromatic Furan compounds include 2,5-dimethylfuran, 2,5-diethylfuran, 2,5-dipropylfuran, 2,5-dibutylfuran, 2,3,4,5-tetramethylfuran, 2,3,4,5-tetraethylfuran, 2,3,4,5-tetrapropylfuran, 2,3,4,5-tetrabutylfuran. More than one Aromatic Furan compound may be used in combination.

Alkyl or Aromatic Halide

In accordance with various embodiments of the present invention, the Alkyl or Aromatic Halide preferably has the formula R$^9$X, wherein R$^9$ is an alkyl group containing 3 to 20 carbon atoms or an aromatic group containing 6 to 18 carbon atoms and X is halogen, preferably chlorine or bromine. Examples of suitable Alkyl or Aromatic Halide include n-propyl chloride, propyl bromide, iso-propyl chloride, iso-propyl bromide, n-butyl chloride, n-butyl bromide, sec-butyl chloride, sec-butyl bromide, tert-butyl chloride, tert-butyl bromide, iso-amyl chloride, iso-amyl bromide, n-hexyl chloride, n-hexyl bromide, n-octyl chloride, n-octyl chloride, 2-ethylhexyl chloride, 2-ethylhexyl chloride, chlorobenzene, bromobenzene, iodobenzene, and combinations thereof. Preferred Alkyl or Aromatic Halide include n-butyl chloride, n-butyl bromide, sec-butyl chloride, sec-butyl bromide, chlorobenzene, and bromobenzene. More than one Alkyl or Aromatic Halide compound may be used in combination.

Formation of Catalyst Precursor

The catalyst precursor is prepared using Magnesium, Alkoxy Silane, Haloginated Silicon, Haloginated Transition Metal Compound, Aromatic Furan Compound, and Alkyl or Aromatic Halide, as previously described. The catalyst precursor is prepared by combining the components in a suitable vessel(s) under suitable reaction conditions that result in the formation of the catalyst precursor.

The order in which the components are added is not generally limited, except as presently described. First, Alkoxysilane compound(s) having the formula R$^1_m$Si(OR$^2$)$_n$ is combined with Halogenized Silicon compound(s) having the formula R$^3_x$SiX$_y$ before either are exposed to Halogenized Transition Metal Compound(s) having the formula M(OR$^4$)$_a$X$_{4-a}$. Desirably, Alkoxysilane compound(s) having the formula R$^1_m$Si(OR$^2$)$_n$ and Halogenized Silicon compound(s) having the formula R$^3_x$SiX$_y$ are combined for from about 10 minutes to about 60 minutes at a temperature of from about 60° C. to about 100° C. before either are exposed to Halogenized Transition Metal Compound(s) having the formula M(OR$^4$)$_a$X$_{4-a}$. If a single vessel is to be used, this requirement is most easily achieved by introducing Alkoxysilane compound(s) having the formula R$^1_m$Si(OR$^2$)$_n$ and Halogenized Silicon compound(s) having the formula R$^3_x$SiX$_y$ into the vessel before introducing Halogenized Transition Metal Compound(s) having the formula M(OR$^4$)$_a$X$_{4-a}$. Alternatively, Alkoxysilane compound(s) having the formula R$^1_m$Si(OR$^2$)$_n$ and Halogenized Silicon compound(s) having the formula R$^3_x$SiX$_y$ can be separately combined. Second, in accordance with the various embodiments, Alkyl or Aromatic Halide is added as the last component. In preferred embodiments, the formation of the catalyst precursor is conducted in situ.

The conditions employed in the steps of the process for preparing the catalyst precursor, including temperature, pressure, time, solvent, and vessel and other equipment used, while important, are not critical limitations to the present invention. The conditions are generally chosen as to be favorable to the overall goal of forming the catalyst precursor. Any experimentation involving selection of conditions would for one of ordinary skill in the art, having the benefit of this disclosure, be routine and not burdensome.

Examples of solvents that may be used for one or more steps associated with the present invention include aliphatic hydrocarbons such as hexane, heptane, octane, or decane;

aromatic hydrocarbons such as toluene or xylene; alicyclic hydrocarbons such as cyclohexane, methylcyclohexane, or decalin; and ethers such as diethyl ether, diisopropyl ether, di-n-butyl ether, di-iso-butyl ether, diisoamyl ether, diallyl ether, tetrahydrofuran (THF), or anisole. Particularly preferred are dibutyl ether, diisoamyl ether, hexane, heptane, toluene, and xylene, used either alone or as mixed solvents, depending on the specific reaction.

In accordance with one set of illustrative embodiments, a catalyst precursor is prepared by a process depicted schematically in the following steps.

Step (1) Mg+alkyl alcohol+$I_2$+alkyl halide→A

Step (2) $R^1_m Si(OR^2)_n + R^3_x SiX_y + A \rightarrow B$

Step (3) B + $M(OR^4)_a X_{4-a}$ ⟶ C

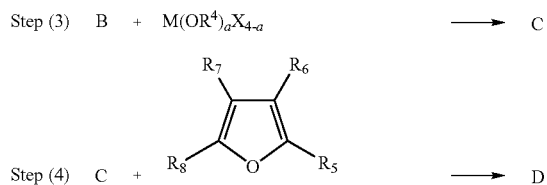

Step (4) C + ⟶ D

Step (5) D+$R^9 X$→Support Catalyst Precursor

Each of these steps is described in more detail below.

Initially, in step (1), magnesium is subjected to a treatment step. Reaction Mixture (A) is obtained by mixing in a suitable solvent metallic magnesium and a small amount of iodine, alkyl alcohol, and alkylhalide. The initial reaction temperature is about 20° C. to about 200° C., preferably about 80° C. to about 90° C., and the reaction time is typically about 0.5 to about 20 hours, preferably about 0.5 to about 2.0 hour.

Next, in step (2), reaction mixture (A) from step (1) is combined with Alkoxysilane having a formula $R^1_m Si(OR^2)_n$ and Halogenized Silicon having a formula $R^3_x SiX_y$. The Reaction Mixture (B) is heated for about 30 minutes to about 60 minutes, preferably about 45 minutes to 60 minutes, in a non-polar solvent to about 50° C. to about 100° C., preferably to about 65° C. to about 85° C. The molar ratio of Alkoxysilane to Halogenized Silicon is from about 0.5 to about 3.0, and more preferably from about 0.8 to about 1.5. Some percentage of the Alkoxysilane may remain in excess and thus, not reacted, in the Mixture (B). The Mixture (B) can be used, and preferably is used, in the next steps in situ without further separation or characterization of any reaction products.

Next, in step (3), Mixture (B) from step (2) is contacted with Halogenized Transition Metal Compound to form Mixture (C). Without being limited to this mechanism, it is believed that this step results in the formation of an organic silicon complex containing transition metal. The ratio of Halogenized Transition Metal Compound to Mg is typically about 0.01 to about 1 and more typically about 0.02 to about 0.5. The reaction is preferably conducted at about 80° C., and the duration of heating may be from about 30 minutes to about 60 minutes, preferably about 40 minutes, once the desired temperature is obtained, to yield the organic silicon complex containing transition metal, which when titanium is employed is typically a brown product. Mixture (C) can be used, and desirably is used, for the following steps in situ without further separation or characterization of any reaction products.

In the step (3), optionally, additional compounds may also be employed as a catalyst activator, such as the organomagnesium compound (e.g., R'MgR" and R'MgX), additional Halogenized Silicon (which may be the same or different as that used in step (2)), and alkylhalide (e.g., $R'''_p X_{4-p}$, 0<p<4), and halogen-substituted alkylaluminum (e.g., $R'''_q AlX_{3-q}$, 0<q<3), where RR', R", and R''' may be the same or different and are desirably $C_2$-$C_{12}$ alkyl groups, more desirably $C_4$-$C_{10}$ alkyl groups, even more desirably $C_4$-$C_8$ alkyl groups, and most desirably R', R", and R''' are each butyl groups, and X is halogen. When this option is employed, the activator/transition metal molar ratio is preferably about 0.1 to about 10, more preferably about 0.2 to about 2.5.

Next, in step (4), Mixture (C) from step (3) is contacted with Aromatic Furan, as an electron donor, to obtain Mixture (D). While not being limited to this mechanism, it is believed that the electron donor coordinates with the transition metal to form catalytically active species. The electron donor is an alkyl substituted aromatic furan compound. The electron donor is preferably employed in amounts sufficient to have a molar ratio of substituted aromatic furan compound to transition metal compound as added in the previous processing step of about 0.010:1 to about 50:1, preferably about 0.02:1 to about 10:1, and most preferably about 0.1:1 to about 5:1. Although the conditions are not generally critical, one acceptable procedure is to heat at about 80° C. for about 30 minutes to about 100 minutes, preferably about 60 minutes, once the desired temperature is obtained to yield the Reaction Mixture (D). The Reaction Mixture (D) can be used, and preferably is used, for the following steps in situ without further separation or characterization of any reaction products.

Finally, the final solid support catalyst precursor is in situ prepared by contacting the Reaction Mixture (D) from step (4) with Alkyl or Aromatic Halide, as depicted in step (5). Desirably, the addition of Alkyl or Aromatic Halide is conducted at a temperature of about 75° C. to about 90° C., preferably about 78° C. to about 82° C., and more preferably about 80° C., over the course of about 2 hours to about 10 hours, preferably over the course of about 3 hours to about 6.5 hours, and more preferably over the course of about 3 hours to about 5 hours. After the addition of Alkyl or Aromatic Halide, the reaction mixture is continually stirred at a temperature of about 75° C. to about 90° C. preferably about 78° C. to about 82° C., and more preferably about 80° C., for about 0.5 to about 6 hours, preferably for about 2 hours to about 4 hours, and more preferably for about 1 hour to about 3 hours. Thereafter, the reactor contents are cooled to a temperature of about 50° C. The resulting precipitate is rapidly washed 2-5 times with 2 L hexane each time at 50° C. A solid magnesium-based supported titanium catalyst precursor composition is obtained for further composition analysis and for polymerization. The molar ratio of Alkyl or Aromatic Halide to metallic Magnesium is about 1.0 to about 3.5, preferably about 1.2 to about 2.0.

In accordance with another set of illustrative embodiments, a catalyst precursor is prepared by a process depicted schematically in the following steps.

Step (1) $R^1_m Si(OR^2)_n + R^3_x SiX_y \rightarrow A$

Step (2) $M(OR^4)_a X_{4-a}$ + A ⟶ B

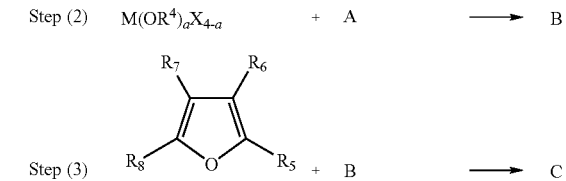

Step (3) + B ⟶ C

Step (4) Mg+$R^9 X$+C→Support Catalyst Precursor

In accordance with preferred embodiments of the invention, the proportions of the components of the catalyst precursor satisfy the following:

K=[Ti (or M)]/([Mg]+[Aromatic Furan]);

G=[Mg]/([Alkoxysilane]+[Halogenized Silicon]); and

H=[Ti]/([Halogenized Silicon]+[Aromatic Furan]).

The molar ratio K is less than 0.50 and preferably is from about 0.05 to about 0.50 and more preferably is from about 0.05 to about 0.30. Molar ratio G is less than 10 and preferably is from about 2.5 to about 10 and more preferably is from about 2.5 to about 5.0. Molar ratio H is less than 5 and preferably is from about 0.2 to about 5 and more preferably is from about 0.2 to about 2.5. Outside of these ranges of K and G values, catalyst activity, hydrogen response, comonomer response, polymer molecular weight distribution, and catalyst morphology can be significantly affected. Also, the toughness of the LLDPE and MDPE resin, catalyzed by the catalysts of the invention, and the strength of the films fabricated therefrom decline.

Catalyst System and Polymerization

Catalyst precursors of the present invention can be combined with cocatalysts, typically and preferably an organoaluminum compound, such as alkyl aluminum compounds, to form solid catalyst systems for the polymerization of alpha-olefins. Catalyst systems in accordance with the various embodiments of the present invention can be used for slurry polymerization or can be subjected to pre-polymerization, which renders the catalyst system suitable for gas phase polymerization processes.

The molar ratio of the cocatalyst, such as alkylaluminum, to the titanium in the catalyst precursor is about 0.05 to about 500. The catalyst precursor may be activated in situ by adding the cocatalyst and catalyst precursor separately to the polymerization medium. It is also possible to combine the catalyst precursor and cocatalyst before their introduction into the polymerization medium, for example for about 2 hours or less and at a temperature from about 20° C. to about 85° C.

Suitable co-catalysts include organometallic compounds, for example, trialkylaluminum compounds such as trimethylaluminum, triethylaluminum, tri(n-propyl)aluminum, tri(isopropyl)aluminum, tri(n-butyl)aluminum, tri(isobutyl)aluminum, tri(t-butyl)aluminum, trihexylaluminum, triamylaluminum, and tri(n-octyl)aluminum; dialkylaluminum hydrides such as diisobutylaluminum hydride; dialkylaluminum halides such as dimethylaluminum chloride, diethylaluminum chloride, diisobutylaluminum chloride, di(t-butyl) aluminum chloride and diamylaluminum chloride; alkylaluminum dihalides such as methylaluminum dichlorides, ethylaluminum dichloride, isobutylaluminum dichloride, t-butylaluminum dichloride and amylaluminum dichloride; dialkylaluminum alkoxides such as diethylaluminum ethoxide; and alkylalumoxanes such as tetraethyldialumoxane, tetrabutyldialumoxane, methylalumoxane and ethylalumoxane. Among these organometallic compounds, trialkylaluminum, the mixture of the trialkylaluminum and the dialkylaluminum halide, and the alkylalumoxane are particularly typical, with trimethylaluminum, triethylaluminum, tri-iso-propylaluminum, and tri(n-octyl)aluminum are examples of particularly preferable activators.

In accordance with various embodiments of the invention, ethylene and alpha-olefins may be copolymerized with the catalyst systems prepared according to aspects of the present invention by any suitable process. Such processes include polymerizations carried out in suspension, in solution, in slurry, and/or in the gas phase. Slurry polymerizations and gas phase polymerizations are particularly typical, especially those taking place in stirred bed reactors and fluidized bed reactors. The ethylene copolymers prepared in accordance with the present invention may be copolymers of ethylene with one or more $C_3$-$C_{10}$ alpha-olefins. Thus, copolymers having two types of monomeric units are possible as well as terpolymers having three types of monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. More preferred co-monomers are 4-methyl-1-pentene, 1-hexene and 1-butene for the catalyst prepared according to the present invention.

The molecular weight of the copolymers may be controlled in a known manner, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the melting index ($I_2$).

In accordance with embodiments of the invention, the solid catalyst system can be directly injected into in stirred bed reactors and fluidized bed gas phase reactors for certain kind of gas phase process. The solid catalyst system can also be subjected to pre-polymerization, thereby obtaining a pre-polymerized catalyst component, which is then used for the gas phase polymerization. In carrying out the pre-polymerization, for example, the solid catalyst precursor and an organoaluminum compound are contacted with an olefin. Examples of the olefin used for the pre-polymerization are ethylene, propylene, and butene-1. The pre-polymerization may be either a homopolymerization or a copolymerization. In the pre-polymerization, it may be preferable to make slurry containing the solid catalyst precursor using a solvent. Examples of suitable solvents include aliphatic hydrocarbons such as butane, pentane, hexane and heptane, and aromatic hydrocarbons such as toluene and xylene. The slurry concentration may typically be from about 0.001 to 0.3 g-solid catalyst precursor/10 ml solvents, and more typically from about 0.02 to about 0.2 g-solid catalyst precursor/10 ml-solvent. The organoaluminum compound may be used in an amount typically from about 0.1 to about 100, more typically from about 0.5 to about 50, calculated as the Al/Ti atomic ratio, i.e., the atomic ratio of the Al atom in the organoaluminum compound to the Ti atom in the solid catalyst precursor. The temperature for the pre-polymerization is typically about −30° C. to about 100° C., and more typically about −10° C. to about 85° C. Yield of the pre-polymer is typically about 0.1 to about 500 g per mmol of Ti, and more typically about 0.5 to about 50 g per mmol of Ti. When used for the gas phase polymerization, the pre-polymerized solid catalyst component obtained may be combined with an inert diluent to form slurry, or dried to obtain a flowing powder.

There are no particular restrictions on the polymerization conditions for production of polyolefins by the method of the invention, such as the polymerization temperature, polymerization time, polymerization pressure, monomer concentration, etc., but typically the polymerization temperature is about −100° C. to about 300° C., the polymerization time is about 10 seconds to about 20 hours, and the polymerization pressure is typically from normal pressure to about 3500 kg/cm$^2$. Hydrogen or the like may be used to adjust the molecular weight during polymerization. The polymerization may be carried out in a batch system, semi-continuous system, or continuous system, and it may be carried out in 2 or more stages under different polymerization conditions. The polyolefin may be directly obtained from gas phase process, or obtained by isolation and recovery of solvent from the slurry process, according to conventionally known methods.

The catalyst systems described herein reduce imperfections of olefin polymerization. When used in copolymerization of ethylene and alpha-olefins, the catalyst systems exhibit enhanced catalyst activity and productivity, enhanced comonomer response, enhanced hydrogen response, enhanced morphology and flow-ability, and improved operation efficiency and reduced electron static. The catalyst produces LLDPE resins of lower density without resin stickiness, chunk formation, or reactor fouling in the fluid bed gas-phase process, especially at high production rates. The resultant polyethylene has narrow molecular weight distributions, enhanced short chain branching distribution (SCBD) or branching homogeneity, high bulk density, low volume of fine powders, and a reduced level of extractable impurities.

The catalysts prepared according to the invention are particularly useful for the production of LLDPE and MDPE and/or HDPE injection resins. Such LLDPE resins may have a density of 0.94 g/cc or less, preferably 0.930 or less or even 0.910 g/cc or less. In accordance with certain aspects of the present invention, it is possible to achieve densities of less than 0.910 g/cc and even 0.880 g/cc. Such MDPE and/or HDPE injection resins may have density of 0.940 g/cc or 0.950 g/cc.

The MWD of the polymers prepared in the presence of catalyst systems of the present invention, as expressed by the MFR values, varies from about 24 to about 80 for LLDPE and MDPE and/or HDPE injection products having a density of about 0.910 to about 0.950 g/cc. MFR is the ratio of the high-load melt index (HLMI or $I_{21}$) to the melt index (MI or $I_2$) for a given resin (MFR=$I_{21}/I_2$). As is known to those skilled in the art, such MFR values are indicative of a relatively narrow MWD. The relatively low MFR values of the copolymers prepared with catalyst systems of this invention indicate that they are suitable for the preparation of various rotational molding products and injection products and film products because such films are likely to have excellent strength properties. LLDPE resins produced in accordance with the present invention preferably contain at least about 80 percent by weight of ethylene units. Most preferably, the LLDPE resins of the invention contain at least 2 weight percent, for example from about 2 to about 20 weight percent of an alpha-olefin.

In the present invention, this catalytic difference is particularly noticeable in that, when determined with a TREF analyzer, the ethane copolymer obtained has a more regular, i.e. better comonomer distribution over the macromolecules than in copolymerization using the comparative catalysts prepared according to European Patent Application EP-0,703,246A1 and/or U.S. Pat. No. 4,105,585, by BP Chemicals. The enhanced short chain distribution of LLDPE resin produced by the catalyst system in the present invention is evidenced via the relationship between the melting point by DSC and resin density. The melting point was taken as the peak of the highest melting endotherm. Homogeneous copolymer and better composition distribution were characterized by a sharp melting endotherm. Increased copolymer heterogeneity, at the same density, tended to broaden the melting endotherm as well as to raise the temperature at which the endotherm occurred. The more uniform branching distribution is shown by the ethylene copolymers made with the catalyst of this invention have crystalline melting point about 1° C.-2° C., which is lower than those of polymers made with the comparative catalysts prepared according to European Patent Application EP-0,703,246A1 and/or U.S. Pat. No. 4,105,585, by BP Chemicals. A decrease in melting point indicates a substantially improved distribution of side chain branches among the copolymer molecules.

The molecular weight distribution of the polymers prepared in the presence of catalyst systems of the present invention, as expressed by MFR value, that is the ratio of the high-load melt index ($I_{21}$) to the melt index ($I_2$), varies from about 20 to 30, and is preferably 24-28, for LLDPE products having a density of about 0.900 to about 0.950 g/cc and an $I_2$ (value) of about 0.1 to about 100. These MFR values indicate a relatively narrow molecular weight distribution of the polymers. The relatively low MFR values of polymers prepared with the catalyst systems of this invention also indicate that they are suitable for the preparation of various film products since such films are likely to have excellent strength properties. Increasing the molecular weight, narrowing molecular weight distribution (MWD), or lowering the density of LLDPE result in improved impact strength and puncture resistance properties. At a given molecular weight and density of polymer, further narrowing molecular weight distribution of polymer results in improved clarity and toughness of film products.

The advantages of the high activity silica-magnesium supported catalyst composition of the present invention include that it is simple and economical to synthesize, it is effective to copolymerize ethylene and alpha-olefin with improved operability, and it is capable of producing ethylene/alpha-olefin copolymers such as LLDPE having a narrow molecular weight distribution, narrow/uniform compositional distribution, and reduced solvent extractable fraction or reduced low molecular weight component. The catalysts have desirable morphology and narrow particle size distributions. The catalysts are capable of producing MDPE and/or HDPE and LLDPE resins at high catalyst efficiencies in a fluid bed gas-phase reactor process without resin stickiness, chunk formation, and reactor fouling caused by electric static. In addition, the highly active support catalyst system of this invention yields products having narrow particle size distribution, good flowability, and high bulk density, which are very desirable from a view point of operation stability and efficiency.

The combination of the catalyst precursor with cocatalyst trialkylaluminum compounds such as trimethylaluminum (TMA), triethylaluminum, tri(n-octyl)aluminum such, and alkylaluminum halides such as dimethylaluminum chloride (DMAC), diethylaluminum chloride (DEAC), ethylaluminum dichloride (EADC) to form a catalyst system show the improved branching compositional distribution and better short chain branching distribution based on TREF and the melting point ($T_m$) of resin by DSC tests. The ethylene copolymers made with the catalyst of this invention have reduced crystalline melting point about 1° C.-2° C., which is lower than those of polymers made with the comparative catalysts. A decrease in melting point indicates a substantially improved distribution of side chain branches among the copolymer molecules.

The present catalyst synthesis method and resulting catalyst system as described above have the uniform and homogeneous active sites for ethylene polymerization and ethylene/alpha-olefin copolymerization. In particular, enhanced hydrogen and co-monomer response with the catalyst system significantly improves the operability. High melt index HDPE or LLDPE can be made with improved efficiencies because of decreased hydrogen requirements. HDPE or LLDPE products with different polymer molecular weight can be varied over a wide range with easy adjustments in reactor hydrogen concentration. Transitions from high to low MI resins with catalysts require removal of high hydrogen concentrations. These transitions can require flaring cycle gas, resulting in lost monomer and comonomer. Reduced hydrogen levels in the reactor will reduce monomer/comonomer loss in transition and recovery, resulting in improved process efficiencies. Reaction production rates can be increased with the catalysts with better hydrogen response, because hydrogen in the cycle gas is replaced with materials with higher heat capacities. On the other hand, catalysts with good comonomer response require significantly less comonomer in the reactor to produce resins of a given density. Reduced comonomer levels in the gas composition leads to less comonomer dissolved in the resin, in turn, improving process efficiency because less comonomer is lost in product discharge and recovery. The combination of less dissolved comonomer in the resin and more homogeneous incorporation (absence of low molecular weight extractable fraction) dramatically reduces resin stickiness in the reaction and conveying processes, allowing increased reactor operating temperature. These factors also allow increased condensing level in the reactor, leading to further process efficiencies.

To facilitate a better understanding of the present invention, the following examples of certain aspects of some embodiments are given. In no way should the following examples be read to limit, or define, the entire scope of the invention.

EXAMPLES

The solid catalyst composition and properties of polymers in the examples were measured according to the following methods:

Ti, Si, and Mg content in the solid catalyst component were determined by ICP emission analysis method;

Melt flow index (MI) of polymer was measured at 190° C., according to ASTM D1238;

Melt flow ratio (MFR), which is the ratio of high melt flow index (HLMI or $I_{21}$) to melt index (MI or $I_2$), was used as a measure of melt fluidity and a measure of the molecular weight distribution of polymer. The melt flow ratio is believed to be an indication of the molecular weight distribution of the polymer, the higher the value, the broader the molecular weight distribution;

Density was measured according to ASTM D 1505-98. Molecular weights and molecular weight distributions of polymers were also determined by gel permeation chromatography (GPC) versus a polyethylene standard. DSC was used to measure the melting point of polymers;

Short chain branching distribution or copolymer/homopolymer composition distribution was determined by using the Temperature Rising Elution Fractionation (or TREF) technique which is well known to those skilled in the art and widely described in the literature. As will be understood by those skilled in the art, the "copolymer" and "homopolymer" fractions of the resin have substantially different branching contents and therefore different corresponding crystallization and dissolution temperature.

Example 1

Anhydrous hexane (2 L), magnesium (31.9 g), iodine (3.3 g), isopropanol (3.66 ml), and butyl chloride (5.8 ml) were successively charged into a 5 L reactor equipped with an anchor stirrer driven by a magnetic motor. The reactor was heated to 85° C. within 60 minutes and then cooled to 80° C. within 20 minutes. Tetraethoxy orthosilicate (30 ml, 134.5 mmol) and silicon tetrachloride (18 ml, 157.1 mmol) were added to the reactor and held for reaction at 80° C. for 20 minutes to yield to a yellow-brown product.

Next, Ti(OPr)$_4$ (23.2 ml, 82.4 mmol) and TiCl$_4$ (9.0 ml, 82.1 mmol) were charged to the organic silicon complex under nitrogen at 80° C., and the slurry mixture was stirred for 0.5 hour to yield organic silicon complex containing titanium, followed by the slow introduction of 2,5-dimethylfuran (20.0 ml, 187.3 mmol) in the hexane solution. The reaction was stirred at 80° C. for 1 hour to yield a brown/yellow reaction product, which was used without further separation.

Then, n-butyl chloride (213.3 ml, 2041.5 mmol) was introduced into the brown/yellow reaction product obtained above over 4 hours at 80° C. After the addition of n-butyl chloride, the reaction mixture was continually stirred at 80° C. for 2 more hours and then cooled to temperature of 50° C. The resulting precipitate was rapidly washed 3 times with 2 L hexane at 50° C. A solid magnesium-based supported titanium catalyst precursor composition was obtained. Analysis shows that the supported catalyst precursor composition contains 3.5 wt % Ti, 1.3 wt % Si, and 14.4 wt % Mg, respectively.

Example 2

A solid magnesium-based supported titanium catalyst composition was prepared in the same manner as in Example 1 except that 2,5-dimethylfuran (10 ml, 93.7 mmol) was used. A solid magnesium-based supported titanium catalyst precursor composition obtained contains 3.6 wt % Ti, 1.4 wt % Si, and 14.6 wt % Mg, respectively.

Example 3

A solid magnesium-based titanium catalyst composition was prepared in the same manner as in Example 1 except that Ti(OPr)$_4$ (19.2 ml, 67.9 mmol) and TiCl$_4$ (7.0 ml, 63.8 mmol) were charged. A solid magnesium-based supported titanium catalyst precursor composition obtained contains 2.8 wt % Ti, 1.6 wt % Si, and 14.8 wt % Mg, respectively.

Example 4

A solid magnesium-based titanium catalyst composition was prepared in the same manner as in Example 1 except that Ti(OPr)$_4$ (16.2 ml, 57.0 mmol) and TiCl$_4$ (6.0 ml, 54.7 mmol) were charged. A solid magnesium-based supported titanium catalyst precursor composition obtained contains 2.5 wt % Ti, 1.5 wt % Si, and 14.6 wt % Mg, respectively.

Example 5

A solid magnesium-based titanium catalyst composition was prepared in the same manner as in Example 1 except that Ti(OPr)$_4$ (46.1 ml, 165.7 mmol) and TiCl$_4$ (18.3 ml, 166.9 mmol) were charged. A solid magnesium-based supported titanium catalyst precursor composition obtained contains 7.5 wt % Ti, 1.5 wt % Si, and 14.7 wt % Mg, respectively.

Comparative Example 1

A solid catalyst precursor was prepared according to U.S. Pat. No. 4,748,221, French Patent No. 2,116,698, and European Patent No. 0 703 246 A1. Anhydrous hexane (2 L), magnesium (31.9 g), iodine (3.3 g), isopropanol (3.66 ml), and butyl chloride (2.8 ml) were successively charged into a 5 L reactor equipped with an anchor stirrer driven by a magnetic motor. The reactor was heated to 85° C. within 60 minutes and then cooled to 80° C. within 20 minutes. Ti(OPr)$_4$ (45.5 ml, 165.4 mmol) with TiCl$_4$ (18.3 ml, 166.0 mmol) was charged to the reactor, followed by the slow introduction over 4 hours of n-butyl chloride (213.3 ml, 2041.5 mmol) at 80° C. The mixture was stirred for a further 2 hours at 80° C., and then cooled to room temperature. The solid precipitate was washed 3 times with 2 L hexane to yield Comparative Catalyst 1. A gray solid magnesium-titanium catalyst precursor composition was obtained, which contains 8.1 wt % Ti, and 14.7 wt % Mg, respectively.

Comparative Example 2

A solid magnesium-based supported titanium catalyst precursor composition was prepared in the same manner as in Example 1 except that 2,5-dimethylfuran was not used. A solid magnesium-based supported titanium catalyst precursor composition was obtained, which contains 3.4 wt % Ti, 1.2 wt % Si, and 14.5 wt % Mg, respectively.

Comparative Example 3

A magnesium-based supported titanium catalyst precursor composition was prepared in the same manner as in Example 1 except that tetraethoxy orthosilicate and silicon tetrachloride was not used. A magnesium-based supported titanium catalyst precursor composition was obtained, which contains 3.5 wt % Ti, 0 wt % Si, and 14.6 wt % Mg, respectively.

Examples 6-13

Slurry Homo-Polymerization

In the slurry polymerization experiments of these Examples, unless otherwise indicated, a 2-liter stainless steel reactor was rendered inert by heating under vacuum at 80° C. for 2 hours. Then, the reactor was purged with nitrogen and successively charged at 65° C. with 1000 mL of dry hexane, 3.0 ml of 1.0 mol tri(n-octyl)aluminum, and 25 mg of solid catalyst precursor composition obtained above (as specified). The internal pressure was increased to 39 psig with hydrogen (29 psi of nitrogen). The reactor was closed, the stirring was increased to 750 rpm, and the internal temperature was raised to 85° C. After charging ethylene via a mass flow controller to maintain the total pressure at about 145 psig, the polymerization was carried out immediately and continued at 85° C. After 60 minutes, the ethylene feed was stopped and reactor cooled and vented. The polymer was treated with methanol to deactivate any residual catalyst, filtered, and dried under vacuum to constant weight. After drying, the polymer was weighed to calculate catalyst activity and a sample of dried powder was used for basic property tests. The results for each catalyst system (using the specified catalyst precursor) are reported in Table 1. These results demonstrate the benefits of the inventive catalyst systems: enhanced activity, relatively high hydrogen response, and lower Ti residue. Resin produced from these catalyst possess narrow molecular weight distribution (low MFR) and relatively high bulk density.

TABLE 1

| Example | Catalyst Example (Ex). | Ti content in Catalyst (wt. %) | Catalyst gm. | Catalyst Activity* | Polymer Properties B.D. | MI | MFR |
|---|---|---|---|---|---|---|---|
| 6 | Ex. 1 | 3.5 | 25 | 6680 | 0.38 | 1.72 | 25.5 |
| 7 | Ex. 2 | 3.6 | 25 | 6018 | 0.38 | 1.62 | 26.5 |
| 8 | Ex. 3 | 2.8 | 25 | 6580 | 0.37 | 1.65 | 26.0 |
| 9 | Ex. 4 | 2.5 | 25 | 6650 | 0.36 | 1.58 | 25.4 |
| 10 | Ex. 5 | 7.5 | 25 | 6421 | 0.39 | 2.10 | 25.3 |
| 11 | Comp Ex. 1 | 8.1 | 30 | 3618 | 0.34 | 1.38 | 29.5 |
| 12 | Comp Ex. 2 | 3.4 | 30 | 2105 | 0.38 | 0.65 | 25.0 |
| 13 | Comp Ex. 3 | 3.5 | 25 | 6030 | 0.29 | 1.45 | 28.9 |

B.D. = bulk density
MI = Melt Index
MFR = Melt Flow Ratio ($I_{21}/I_2$)
*Activity = gm Polymer/gm Catalyst/hr Examples 14-21

Slurry Co-Polymerization

In the slurry polymerization experiments of this Example, unless otherwise indicated, a 2-liter stainless steel reactor was rendered inert by heating under vacuum at 80° C. for 2 hours. Then, a reactor was purged with nitrogen and successively charged at 65° C. with 1000 mL of dry hexane, 3.0 ml of 1.0 mol tri(n-octyl)aluminum, and 25 mg of solid catalyst precursor composition obtained above (as specified). The internal pressure was increased to 39 psig with hydrogen (29 psi of nitrogen). The reactor was closed, the stirring was increased to 750 rpm, and the internal temperature was raised to 85° C. Then, the amount of 1-hexene indicated in Table 2 was charged, followed by charging ethylene to maintain the total pressure at about 90 psig. The polymerization was carried out immediately and continued at 85° C. for 40 minutes. Then, the ethylene feed was stopped and reactor cooled and vented. The polymer was treated with methanol to deactivate any residual catalyst, filtered, and dried under vacuum to constant weight. After drying, the polymer was weighed to calculate catalyst activity and a sample of dried powder was used for basic property tests. The results for each catalyst system (using the specified catalyst precursor) are reported in Table 2. The results indicates that the inventive catalysts shows enhanced activity, relatively improved hydrogen response, narrow molecular weight distribution, enhanced short chain branching distribution based on TREF and the melting point ($T_m$) of resin, and enhanced morphology without reactor fouling.

TABLE 2

| Example | Catalyst Example (Ex). | Ti content in Catalyst (wt. %) | Catalyst gm. | 1-Hexene ml | Catalyst Activity* | Polymer Properties Density g/ml | MI | MFR | Tm ° C. | Reactor Status |
|---|---|---|---|---|---|---|---|---|---|---|
| 14 | Ex. 1 | 3.5 | 25 | 120 | 7368 | 0.9180 | 1.75 | 27.5 | 122.5 | |
| 15 | Ex. 2 | 3.6 | 25 | 120 | 6025 | 0.9189 | 1.23 | 27.8 | 123.0 | |
| 16 | Ex. 3 | 2.8 | 25 | 120 | 7280 | 0.9185 | 1.51 | 26.6 | 122.5 | |
| 17 | Ex. 4 | 2.5 | 25 | 120 | 9250 | 0.9195 | 1.25 | 26.2 | 123.2 | |
| 18 | Ex. 5 | 7.5 | 25 | 120 | 6815 | 0.9165 | 1.90 | 27.6 | 122.1 | |
| 19 | Comp Ex. 1 | 8.1 | 30 | 120 | 4150 | 0.9170 | 1.12 | 34.2 | 124.3 | Reactor fouling Powder sticky |

TABLE 2-continued

| Example | Catalyst Example (Ex). | Ti content in Catalyst (wt. %) | Catalyst gm. | 1-Hexene ml | Catalyst Activity* | Polymer Properties | | | | |
|---|---|---|---|---|---|---|---|---|---|---|
| | | | | | | Density g/ml | MI | MFR | Tm °C. | Reactor Status |
| 20 | Comp Ex. 2 | 3.4 | 30 | 120 | 2215 | 0.9250 | 0.72 | 24.2 | 125.2 | |
| 21 | Comp Ex. 3 | 3.5 | 30 | 120 | 5785 | 0.9180 | 1.38 | 28.3 | 124.0 | Reactor fouling |

MI = Melt Index
MFR = Melt Flow Ratio ($I_{21}/I_2$)
Tm = Melting Point
*Activity = gm Polymer/gm Catalyst/hr Example 22

Pre-Polymerization

Two liters of n-hexane, 48 millimoles of tri(n-octyl)aluminum and a quantity of previously prepared catalyst precursors (selecting from Examples 1-5 and Comparative Examples 1-3) containing 12.6 millimoles of titanium were introduced into a 5 liter stainless steel reactor maintained under nitrogen atmosphere, provided with a stirring device rotating at 750 revolutions per minute and heated to 68° C. Hydrogen was then introduced to obtain a partial pressure of 0.5 bar, and ethylene was introduced at a steady flow rate of 160 g/h for 3 hours. At the end of this time, the reactor was degassed and its contents were transferred into a flask evaporator in which the n-hexane was removed under vacuum followed by nitrogen heating to about 40° C. to about 50° C. After evaporation, 480 g of prepolymer containing 42.0 g polyethylene per millimole of titanium were obtained as a pre-polymerized catalyst component. The prepolymers for each catalyst precursor are prepared and then used for the gas phase polymerization.

Example 23-37

Gas Phase Copolymerization of Ethylene and 1-butene

Co-polymerization was carried out in a 10 liter autoclave designed for stirred gas phase polymerization, equipped with an anchor stirrer with magnetic stirrer drive above the top of autoclave and a valve at the base of the autoclave to withdraw polymer. The temperature was regulated using steam/water via the outer jacket of the autoclave. A fluidized seed particle of polymer (200 g) and a quantity of prepolymer (30-60 g) previously prepared according to Example 22 were introduced into the 10 liter gas phase polymerization reactor maintained under nitrogen atmosphere, provided with a stirring device rotating at 150 revolutions per minute and heated to 62° C. Nitrogen and hydrogen were charged into the reactor to provide total pressure of 3 bars and a given ratio of hydrogen and ethylene ($PH_2/PC_2$) partial pressure indicated in Table 3. After the reactor temperature was raised to 75° C., ethylene (7 bars) was charged into the reactor to obtain total pressure of 10 bars, together with 1-butene ($C_4$) at a given $C_4/C_2$ molar ratio indicated in Table 3. The copolymerization was maintained at 75° C. The feed of $C_4/C_2$ was continued at a given $C_4/C_2$ molar ratio until 1000 grams of ethylene was consumed during the gas phase polymerization. The reactor was then cooled down and degassed and an ethylene/1-butene polymer free from agglomerate was drawn off. The polymer was used for property tests. The results for each catalyst are reported in Table 3.

Example 38-45

Gas Phase Copolymerization of Ethylene and 1-hexene

Co-polymerization was carried out in a 10 liter autoclave designed for stirred gas phase polymerization, equipped with an anchor stirrer with magnetic stirrer drive above the top of autoclave and a valve at the base of the autoclave to withdraw polymer. The temperature was regulated using steam/water via the outer jacket of the autoclave. A fluidized seed particle of polymer (200 g) and a quantity of prepolymer (30-60 g) previously prepared according to Example 22 were introduced into the 10 liter gas phase polymerization reactor maintained under nitrogen atmosphere, provided with a stirring device rotating at 150 revolutions per minute and heated to 65° C. Nitrogen and hydrogen were charged into the reactor to provide total pressure of 5 bars and a given ratio of hydrogen and ethylene ($PH_2/PC_2$) partial pressure indicated in Table 4. After the reactor temperature was raised to 85° C., ethylene (5 bars) was charged into the reactor to obtain total pressure of 10 bars, together with 1-hexene ($C_6$) at a given $C_6/C_2$ molar ratio indicated in Table 4. The copolymerization was maintained at 85° C. The feed of $C_6/C_2$ was continued at a given $C_6/C_2$ molar ratio until 1000 grams of ethylene was consumed during the gas phase polymerization. The reactor was then cooled down and degassed and an ethylene/1-hexene polymer free from agglomerate was drawn off. The polymer was used for property tests. The results for each catalyst are reported in Table 4.

TABLE 3

| Example | Catalyst Example (Ex). | Ti content in Catalyst (wt. %) | $H_2/C_2$ mol/mol | $C_4/C_2$ mol/mol | Productivity* | Polymer Properties | | | | | |
|---|---|---|---|---|---|---|---|---|---|---|---|
| | | | | | | B.D. | MI | MFR | Density g/ml | Tm °C. | Reactor Status |
| 23 | Ex. 1 | 3.5 | 0.14 | 0.079 | 1356 | 0.370 | 2.358 | 25.3 | 0.9238 | 122.6 | |
| 24 | Ex. 1 | 3.5 | 0.14 | 0.095 | 1395 | 0.360 | 1.633 | 27.2 | 0.9209 | 122.2 | |
| 25 | Ex. 1 | 3.5 | 0.14 | 0.110 | 1432 | 0.368 | 2.015 | 26.0 | 0.9189 | 121.7 | |
| 26 | Ex. 1 | 3.5 | 0.14 | 0.126 | 1470 | 0.369 | 1.652 | 27.4 | 0.9166 | 121.4 | |

TABLE 3-continued

| | Catalyst | Ti content | | | | Polymer Properties | | | | | |
|---|---|---|---|---|---|---|---|---|---|---|---|
| Example | Example (Ex). | in Catalyst (wt. %) | $H_2/C_2$ mol/mol | $C_4/C_2$ mol/mol | Productivity* | B.D. | MI | MFR | Density g/ml | Tm °C. | Reactor Status |
| 27 | Ex. 1 | 3.5 | 0.21 | 0.110 | 1432 | 0.360 | 4.787 | 26.2 | 0.9217 | 122.4 | |
| 28 | Ex. 1 | 3.5 | 0.29 | 0.110 | 1313 | 0.379 | 8.963 | 26.0 | 0.9225 | 122.5 | |
| 29 | Ex. 2 | 3.6 | 0.14 | 0.110 | 1050 | 0.330 | 0.514 | 28.0 | 0.9211 | 122.1 | |
| 30 | Ex. 3 | 2.8 | 0.21 | 0.110 | 1313 | 0.354 | 1.789 | 25.6 | 0.9218 | 122.3 | |
| 31 | Ex. 4 | 2.5 | 0.14 | 0.110 | 1313 | 0.360 | 0.750 | 26.2 | 0.9203 | 122.4 | |
| 32 | Comp Ex. 1 | 8.1 | 0.14 | 0.079 | 1356 | 0.370 | 1.460 | 31.8 | 0.9231 | 123.3 | |
| 33 | Comp Ex. 1 | 8.1 | 0.14 | 0.095 | 1278 | 0.320 | 0.997 | 30.2 | 0.9201 | 123.5 | |
| 34 | Comp Ex. 1 | 8.1 | 0.14 | 0.110 | 1098 | 0.350 | 1.719 | 29.6 | 0.9179 | 122.6 | Reactor fouling, chunking Powder sticky |
| 35 | Comp Ex. 1 | 8.1 | 0.29 | 0.110 | 1032 | 0.358 | 4.413 | 29.7 | 0.9221 | 124.0 | Chunking |
| 36 | Comp Ex. 2 | 3.4 | 0.14 | 0.110 | 870 | 0.360 | 0.650 | 28.5 | 0.9250 | 124.8 | |
| 37 | Comp Ex. 3 | 3.5 | 0.14 | 0.110 | 1325 | 0.355 | 1.385 | 30.4 | 0.9185 | 122.1 | Reactor fouling |

MI = Melt Index
MFR = Melt Flow Ratio ($I_{21}/I_2$)
Tm = Melting Point
*Productivity = g Polymer/g catalyst/hr/100 psi ethylene

TABLE 4

| | Catalyst | Ti content | | | | Polymer Properties | | | | |
|---|---|---|---|---|---|---|---|---|---|---|
| Example | Example (Ex). | in Catalyst (wt. %) | $H_2/C_2$ mol/mol | $C_6/C_2$ mol/mol | Productivity* | B.D. | MI | MFR | Density g/ml | Reactor Status |
| 38 | Ex. 1 | 3.5 | 0.12 | 0.110 | 1345 | 0.370 | 0.727 | 28.3 | 0.9195 | |
| 39 | Ex. 1 | 3.5 | 0.16 | 0.110 | 1398 | 0.368 | 1.650 | 27.2 | 0.9201 | |
| 40 | Ex. 1 | 3.5 | 0.20 | 0.126 | 1400 | 0.355 | 3.620 | 28.0 | 0.9180 | |
| 41 | Ex. 1 | 3.5 | 0.40 | 0.031 | 1270 | 0.400 | 5.547 | 26.4 | 0.9370 | |
| 42 | Comp Ex. 1 | 8.1 | 0.16 | 0.110 | 1026 | 0.350 | 1.091 | 30.3 | 0.9207 | |
| 43 | Comp Ex. 1 | 8.1 | 0.20 | 0.126 | 978 | 0.330 | 1.915 | 33.4 | 0.9173 | Reactor fouling, chunking Powder sticky |
| 44 | Comp Ex. 2 | 3.4 | 0.16 | 0.110 | 650 | 0.370 | 0.367 | 29.0 | 0.9238 | |
| 45 | Comp Ex. 3 | 3.5 | 0.16 | 0.110 | 1146 | 0.326 | 1.275 | 28.4 | 0.9190 | Reactor fouling |

MI = Melt Index
MFR = Melt Flow Ratio ($I_{21}/I_2$)
Tm = Melting Point
*Productivity = g Polymer/g Catalyst/hr/100 psi ethylene As shown in Tables 1-4, the catalyst precursors and catalyst systems in accordance with the present invention shows desirable catalyst activity, hydrogen response, morphology without reactor fouling, and comonomer response, as well as narrow molecular weight distribution for the both slurry and stirred gas phase polymerization of ethylene and ethylene copolymerization with high alpha-olefins.

The magnesium-based titanium catalyst in the Comparative Example 1, prepared according to U.S. Pat. No. 4,748,221 and European Patent No. 0 703 246 A1 had poor catalyst morphology and produced LLDPE resin with broader molecular weight distribution and higher content of lower molecular weight fraction, which significantly deteriorate LLDPE film properties in the commercial film applications. In particular, it is difficult for this catalyst system to produce LLDPE with a density of less than 0.918 at high catalyst productivity rates because of poor powder flowability caused by resin stickiness, chunk formation, and reactor fouling.

The catalysts in the Comparative Example 2, prepared by using $Si(OEt)_4/SiCl_4$ without using substituted aromatic furan compounds as electron donor show low activity, poor comonomer response and poor hydrogen response, which are so poor that the target HDPE and LLDPE products could not be produced.

The catalysts in the Comparative Example 3, prepared by using substituted aromatic furan compounds as electron donor, but without using $Si(OEt)_4/SiCl_4$ results in poor operability due to reactor fouling, and high electric static.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A catalyst precursor, prepared by a process comprising the steps of combining in a reactor:

magnesium;
a compound having the formula $R^1{}_m Si(OR^2)_n$,
wherein $R^1$ and $R^2$ are independently $C_1$-$C_{20}$ hydrocarbyl, m is 0-3, n is 1-4, and m+n=4, and wherein each $R^1$ and each $R^2$ may be the same or different;
a compound having the formula $R^3{}_x SiX_y$,
wherein $R^3$ is $C_1$-$C_{20}$ hydrocarbyl, X is halogen, x is 0-3, y is 1-4, and x+y=4, and wherein each X and each $R^3$ may be the same or different;
a compound having the formula $M(OR^4)_a X_{4-a}$,
wherein M is a transition metal selected from the group consisting of Ti, Zr, Hf, and V,
wherein $R^4$ is $C_1$-$C_{20}$ hydrocarbyl, X is halogen, and $0 < a \leq 4$
wherein each X and each $R^4$ may be the same or different;
a substituted aromatic furan compound having a structural formula,

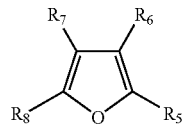

wherein $R^5$ and $R^8$ are independently $C_1$-$C_{20}$ hydrocarbons, and
wherein $R^6$ and $R^7$ are independently hydrogen or $C_1$-$C_{20}$ hydrocarbons; and an alkyl halide or aromatic halide compound having the formula $R^9 X$,
wherein $R^9$ is an alkyl group containing from 3 to 20 carbon atoms or an aromatic group containing from 6 to 18 carbon atoms and X is halogen;
wherein the compounds having the formulas $R^1{}_m Si(OR^2)_n$ and $R^3{}_x SiX_y$, are combined prior to either being exposed to the compound having the formula $M(OR^4)_a X_{4-a}$, and
wherein the alkyl halide or aromatic halide compound having the formula $R^9 X$ is introduced to the reactor after the addition of magnesium, the substituted aromatic furan, and the compounds having the formulas $R^1{}_m Si(OR^2)_n$, $R^3{}_x SiX_y$, and $M(OR^4)_a X_{4-a}$.

2. The catalyst precursor of claim 1, wherein the magnesium is subjected to a treatment step comprising exposing the magnesium to one or more of iodine, alkyl-alcohol, and alkyl or aromatic halide.

3. The catalyst precursor of claim 1, wherein compound having formula $R^1{}_m Si(OR^2)_n$ is selected from the group consisting of tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethyoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropyloxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropyloxysilane, dibutyldibutoxysilane, dibutyldiphenoxysilane, diisobutyldiethoxysilane, diisobutyl-diisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane, chlorophenyldiethyoxysilane, and combinations thereof.

4. The catalyst precursor of claim 1, wherein the molar ratio of compound having the formula $R^1{}_m Si(OR^2)_n$ to magnesium is from about 0.01 to about 10.

5. The catalyst precursor of claim 1, wherein compound having formula $R^3{}_x SiX_y$ is selected from the group consisting of tetrachlorosilane, allyltrichlorosilane, ethyltrichlorosilane, methyltrichlorosilane, dichlorodiphenylsilane, and combinations thereof.

6. The catalyst precursor of claim 1, wherein compound having formula $M(OR^4)_a X_{4-a}$ comprises titanium.

7. The catalyst precursor of claim 1, wherein $M(OR^4)_a X_{4-a}$ is in situ prepared by reacting $Ti(OR^4)_4$ with a titanium halide compound or by reacting $R^4 OH$ with a titanium halide compound.

8. The catalyst precursor of claim 7, wherein the titanium halide compound is selected from the group consisting of $TiCl_4$, $TiBr_4$, and $3TiCl_3 \cdot AlCl_3$.

9. The catalyst precursor of claim 7, wherein $Ti(OR^4)_4$ is selected from the group consisting of tetra-n-butoxytitanium, tetra-isobutoxytitanium, tetra-sec-butoxytitanium, tetra-tert-butoxytitanium, tetra-n-pentyloxytitanium, tetracyclopentyloxytitanium, tetra-n-hexyloxytitanium, tetracyclohexyloxytitanium, tetra-n-heptyloxytitanium, tetra-n-octyloxytitanium, tetra-2-ethylhexyloxytitanium, tetranonyloxytitanium, tetradecyloxytitanium, tetraoleyloxytitanium, tetraallyloxytitanium, tetrabenzyloxytitanium, tetrabenzhydryloxytitanium, tetraphenoxytitanium, tetra-o-methylphenoxytitanium, tetra-m-methylphenoxytitanium, tetra-1-naphthyloxytitanium, tetra-2-naphthyloxytitanium, and combinations thereof.

10. The catalyst precursor of claim 1, wherein compound having formula $M(OR^4)_a X_{4-a}$ is selected from the group consisting of monomethoxytrichlorotitanium, dimethoxydichlorotitanium, trimethoxymonochlorotitanium, monoethoxytrichlorotitanium, monoethoxytrifluorotitanium, monomethoxy-trifluorotitanium, diethoxydifluorotitanium, diethoxydichlorotitanium, diethoxydibromotitanium, triethoxyfluorotitanium, triethoxychlorotitanium, tetraethoxytitanium, monopropoxytrichlorotitanium, dipropoxydichlorotitanium, diisopropoxydichlorotitanium, diisopropoxydibromotitanium, tripropoxyfluorotitanium, tripropoxychlorotitanium, tetra-n-propoxytitanium, tetraisopropoxytitanium, monobutoxytrichlorotitanium, monoisobutoxytrichlorotitanium, dibutoxydichlorotitanium, diisopropoxy-dichlorotitanium, tributoxyfluorotitanium, tributoxychlorotitanium, triisobutoxychlorotitanium, monopentoxytrichlorotitanium, dipentoxydichlorotitanium, tripentoxy-monochlorotitanium, monooctyloxy-trichlorotitanium, dioctyloxydichlorotitanium, trioctyloxymonochlorotitanium, mono-2-ethylhexyloxytrichlorotitanium, di-2-ethylhexyloxydichlorotitanium, tri-2-ethylhexyloxymonochlorotitanium, monophenoxytrichlorotitanium, diphenoxy-dichlorotitanium, triphenoxychlorotitanium, tri-o-xylenoxychlorotitanium, and combinations thereof.

11. The catalyst precursor of claim 1, wherein the molar ratio of compound having formula $R^3{}_x SiX_y$ to compound having formula $M(OR^4)_a X_{4-a}$ is about 0.1 to about 10.

12. The catalyst precursor of claim 1, wherein the combining of magnesium, the substituted aromatic furan, and the compounds having the formulas $R^1{}_m Si(OR^2)_n$, $R^3{}_x SiX_y$, and $M(OR^4)_a X_{4-a}$ is conducted at about 75° C. to about 85° C.

13. The catalyst precursor of claim 1, wherein the substituted aromatic furan is selected from the group consisting of 2-ethyl-3,4-dimethylfuran, 2,5-dimethylfuran, 2,5-diethylfuran, 2,5-dipropylfuran, 2,5-dibutylfuran, 2,3,4,5-tetramethylfuran, 2,3,4,5-tetraethylfuran, 2,3,4,5-tetrapropylfuran, 2,3,4,5-tetrabutylfuran, 2-ethyl-3,5-dimethylfuran, 5-ethyl-2,3-dimethylfuran, 2,5-dimethyl-3-(1-methylethyl)furan, 3,5-dimethyl-2-(1-methylethyl)furan, 2,5-dimethylfuran-3-methanol, 2,4-dimethyl-3-propylfuran, 2,3-dimethyl-5-propylfuran, 2,3-diethyl-5-methylfuran, 2,5-dimethyl-3-propylfuran, 2-(methoxymethyl)3,4,5-trimethylfuran, 2,5-diethyl-3,4-dimethylfuran, 3,4-diethyl-2,5-dimethylfuran, 2,4-diethyl-3,5-dimethylfuran, 2,5-dimethyl-3-ethylfuran, 2,3-dimethyl-5-ethylfuran, 3-ethyl-2,4-dimethylfuran, 2-ethyl-3,5-dimethylfuran, 2,3,5-trimethylfuran, 2,3,4-trimethylfuran, 3,4-bis(chloromethyl)-2,5-dimethylfuran, 3,5-bis(chloromethyl)-2-methylfuran, 3-(chloromethyl)-2,5-dimethylfuran, 2,3-dimethyl-5-(trifluoromethyl)furan, 2,4-diethyl-3,5-dimethylfuran, 2,5-Bis(bromomethyl)furan, 5-(chloromethyl)-4-methyl-2-furancarboxaldehyde, 2,4,5-trimethyl-3-furanmethanol, 3,4-dimethyl-2,5-furandicarboxaldehyde, 2,5-dimethyl-3,4-furandicarboxaldehyde, 2,4-dimethyl-3-furanmethanol, 2,5-dimethylfuran-3-methanol, 2-ethenyl-3,5-dimethylfuran, 5-ethenyl-2,3-dimethylfuran, 3,5-dimethylfurfuryl alcohol, 4,5-dimethyl-2-furanmethanol, 3,4,5-trimethyl-2-furancarboxaldehyde, 3,4,5-trimethyl-2-furancarbonitrile, 2,5-methyl-3,4-furandimethanol, 3-ethenyl-2,5-dimethylfuran, and combinations thereof.

14. The catalyst precursor of claim 1, wherein the compound having the formula $M(OR^4)_aX_{4-a}$ is added to the reactor over the course of about 30 minutes to about 60 minutes at about 80° C.

15. The catalyst precursor of claim 1, wherein the molar ratio of —$M(OR^4)_aX_{4-a}$— to the furan is about 0.1 to about 5.

16. The catalyst precursor of claim 1, wherein a K value defined as K=[M]/([magnesium]+[aromatic furan]) has a value of about 0.05 to about 0.50.

17. The catalyst precursor of claim 1, wherein a G value defined as G=[Mg]/[$R^1_mSi(OR^2)_n$]+[$R^3_xSiX_y$] has a value of about 2.5 to about 10.0.

18. The catalyst precursor of claim 1, wherein an H value defined as H=[Ti]/([$R^3_xSiX_y$]+[aromatic furan]) has a value of 0.2 to about 5.0.

19. The catalyst precursor of claim 1, wherein compound having formula $R^9X$ is selected from the group consisting of butylchloride and chlorobenzene.

20. The catalyst precursor of claim 1, wherein an addition of alkyl or aromatic halide is conducted for from about 3.0 hours to about 6.5 hours at about 80° C., and wherein the reactor is thereafter maintained at about 80° C. for from about 2 hours to about 4 hours.

21. A catalyst precursor prepared by:
(i) mixing a metallic magnesium powder with iodine, alkyl-alcohol, and alkylhalide;
(ii) contacting a compound having the formula $R^1_mSi(OR^2)_n$ with a compound having the formula $R^3_xSiX_y$ in the presence of the mixture of step (i);

wherein $R^1$ and $R^2$ are independently $C_1$-$C_{20}$ hydrocarbyl, m is 0-3, n is 1-4, and m+n=4, and wherein each $R^1$ and each $R^2$ may be the same or different, and wherein $R^3$ is $C_1$-$C_{20}$ hydrocarbyl, X is halogen, x is 0-3, y is 1-4, and x+y=4, and wherein each X and each $R^3$ may be the same or different;

(iii) contacting a compound having the formula $M(OR^4)_aX_{4-a}$ with the mixture of step (ii)
wherein M is a transition metal selected from the group consisting of Ti, Zr, Hf, and V, $R^4$ is $C_1$-$C_{20}$ hydrocarbyl, X is halogen, and 0<a≦4, and wherein each X and each $R^4$ may be the same or different (iv) contacting the mixture of step (iii) with a substituted aromatic furan compound having a structural formula,

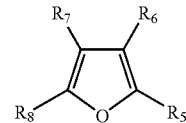

wherein $R^5$ and $R^8$ are independently $C_1$-$C_{20}$ hydrocarbons, and
wherein $R^6$ and $R^7$ are independently hydrogen or $C_1$-$C_{20}$ hydrocarbons; and (v) contacting the mixture of step (iv) with alkyl halide or aromatic halide compound having the formula $R^9X$,
wherein $R^9$ is an alkyl group containing from 3 to 20 carbon atoms or an aromatic group containing from 6 to 18 carbon atoms and X is halogen, to yield a solid catalyst precursor.

22. A process for copolymerizing ethylene and alpha-olefin, comprising polymerizing ethylene and alpha-olefin in the presence of a catalyst precursor in accordance with claim 21, which has been activated by contacting the catalyst precursor with cocatalyst.

23. The process of claim 22, wherein the cocatalyst is selected from the group consisting of trimethylaluminum, triethylaluminum, tri-iso-propylaluminum, tri(n-octyl)aluminum, dimethylaluminum chloride, and combinations thereof.

24. The process of claim 22, wherein the molar ratio of the cocatalyst to transition metal M in the catalyst precursor is from about 0.05 to about 500.

25. The process of claim 22, wherein the catalyst precursor is prepolymerized in the presence of cocatalyst and ethylene prior to copolymerizing ethylene and alpha-olefin in a fluidized gas phase polymerization process.

26. The process of claim 22, wherein the catalyst precursor is directly used in the presence of cocatalyst for copolymerizing ethylene and alpha-olefin in a fluidized gas phase polymerization process.

\* \* \* \* \*